United States Patent
Kamhi et al.

(10) Patent No.: US 7,536,485 B2
(45) Date of Patent: May 19, 2009

(54) PROCESSOR HAVING INACTIVE STATE OF OPERATION AND METHOD THEREOF

(75) Inventors: Gila Kamhi, Zichron Yaakov (IL); Zelig Wayner, Haifa (IL); Amit Gradstein, Binyamina (IL); Yoad Yagil, Haifa (IL); Thierry Pons, Hadera (IL); Ittai Anati, Haifa (IL); Ranan Fraer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 11/319,805

(22) Filed: Dec. 29, 2005

(65) Prior Publication Data

US 2007/0174589 A1 Jul. 26, 2007

(51) Int. Cl.
*G06F 13/10* (2006.01)
*G06F 1/32* (2006.01)

(52) U.S. Cl. .............................. 710/8; 713/320; 713/330

(58) Field of Classification Search ........................ None
See application file for complete search history.

(56) References Cited

U.S. PATENT DOCUMENTS 6,771,118 B2 * 8/2004 Bittlestone et al. .......... 327/544
2008/0045166 A1 * 2/2008 Koch et al. ................ 455/127.5

FOREIGN PATENT DOCUMENTS

WO WO 2005/106626 A1 * 11/2005

OTHER PUBLICATIONS

Patent Office of the People's Republic of China, First Office Action dated Jun. 20, 2008, with English language translation.

* cited by examiner

*Primary Examiner*—Ilwoo Park
(74) *Attorney, Agent, or Firm*—Trop, Pruner & Hu, P.C.

(57) ABSTRACT

Embodiments of the present invention provide a processor having an inactive state of operation and methods thereof. The processor, according to some demonstrative embodiments of the invention, the processor may include a controller to determine an inactive state of operation is to be entered, and to cause a predetermined set of one or more execution units to execute a predetermined sequence of one or more micro-operations prior to entering the inactive state. Other embodiments are described and claimed.

25 Claims, 5 Drawing Sheets

PROCESSOR HAVING INACTIVE STATE OF OPERATION AND METHOD THEREOF

BACKGROUND OF THE INVENTION

A processor may be in an active state of operation, e.g., while performing a processing operation; or an inactive state of operation, in which the processor may consume a reduced amount of electrical power compared to the electrical power consumed by the processor when in the active state of operation.

At least part of the power consumed by the processor in the inactive state of operation may be due to a power leakage through one or more logic elements of the processor, e.g., combination and/or sequential logic elements. For example, the logic elements may include a plurality of transistors, which may consume power even when in an inactive or "off" state of operation, e.g., due to an electric field between the transistor-source and transistor-drain. The amount of power consumed by the processor may increase if the processor resides in the inactive state of operation during relatively long time periods. In some applications, particularly those that operate on battery power, it may not be desirable for excessive power to be consumed by a processor. Moreover, excessive power consumption is some electronics systems may cause heat to be generated, which may be undesirable (e.g., in a laptop computer).

Prior art techniques for managing power consumption in a processor during an inactive state include increasing a threshold voltage applied to one or more transistors of the processor. However, while increasing the threshold voltage may reduce power leakage, it may have the undesirable effect of reducing performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
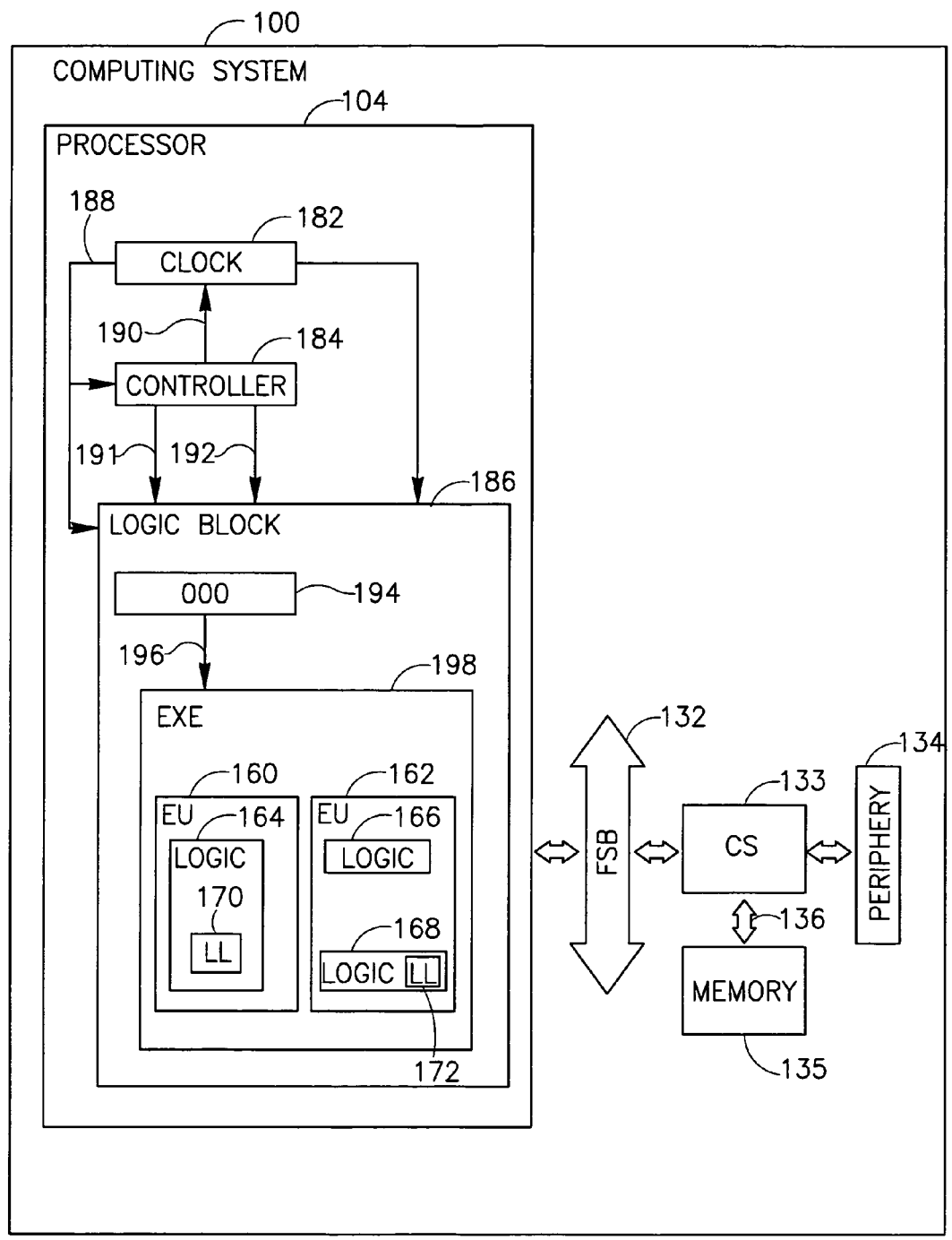
FIG. 1 is a schematic illustration of a computing system including a processor in accordance with one demonstrative embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of embodiments of the invention. However, it will be understood by those of ordinary skill in the art that embodiments of the invention may be practiced without these specific details. In other instances, well-known methods, procedures, components and circuits may not have been described in detail so as not to obscure embodiments of the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing system, computing system, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, compact disk read only memory (CD-ROM), compact disk recordable (CD-R), compact disk rewriteable (CD-RW), optical disk, magnetic media, various types of digital versatile disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Reference is made to FIG. 1, which schematically illustrates a computing system 100 in accordance with one demonstrative embodiment of the present invention.

According to some demonstrative embodiments, system 100 may include a processor 104. Processor 104 may include, for example, a central processing unit (CPU), a digital signal processor (DSP), a microprocessor, a host processor, a plurality of processors, a controller, a chip, a microchip, or any other suitable multi-purpose or specific processor or controller.

According to some demonstrative embodiments of the invention, system 100 may also include a shared bus, such as a "front side bus" (FSB) 132. For example, FSB 132 may be a CPU data bus able to carry information between processor 104, and other devices of computing system 100. In accordance with some demonstrative embodiments of the invention, FSB 132 may connect between processor 104 and a chipset (CS) 133. Although the invention is not limited in this respect, chipset 133 may include one or more motherboard chips, e.g., a "northbridge" and a "southbridge", and/or a "firmware hub". Chipset 133 may include connection points for additional buses and/or devices of computing system 100.

According to some demonstrative embodiments of the invention, system 100 may include one or more peripheries 134, which may be connected to chipset 133. For example, periphery 134 may include an input unit, e.g., a keyboard, a mouse, a touch-pad, or other suitable pointing device or input device; an output unit, e.g., a cathode ray tube (CRT) monitor, a liquid crystal display (LCD) monitor, or other suitable monitor or display unit. In some embodiments the aforementioned output devices may be coupled to chipset 133, such as in the case of a system containing a firmware hub. In some embodiments, periphery 134 may include a storage unit, e.g., a hard disk drive, a floppy disk drive, a compact disk (CD) drive, a CD-Recordable (CD-R) drive, or other suitable removable and/or fixed storage unit.

According to some demonstrative embodiments of the invention, system 100 may include a memory 135, e.g., a system memory connected to chipset 133 via a memory bus 136. Memory 135 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. System 100 may additionally include other suitable hardware components and/or software components.

In some embodiments, system 100 may include or may be, for example, a computing system, e.g., a personal computer, a desktop computer, a mobile computer, a laptop computer, a notebook computer, a terminal, a workstation, a server computer, a personal digital assistant (PDA) device, a tablet computer, a network device, a micro-controller, a cellular phone, a camera, or any other suitable computing and/or communication device.

According to some demonstrative embodiments of the invention, processor 104 may be in an active state of operation, or an inactive state of operation, e.g., as are known in the art. For example, processor 104 may be in the active state of operation while performing a processing operation, e.g., as is known in the art. When in the inactive state of operation, for example, a "standby" state, a "sleep" state, a "power down" state, a "deep sleep" state and/or any other inactive state of operation, processor 104 may consume a reduced amount of electrical power, e.g., compared to the electrical power consumed by processor 104 when in the active state of operation.

According to some demonstrative embodiments of the invention, processor 104 may include a clock 182, a controller 184, and a logic block 186, as are described in detail below. According to some demonstrative embodiments of the invention, clock 182 may provide controller 184 and/or logic block 186 with a clock signal 188, for example, during the active state of operation of processor 104, e.g., as is known in the art. According to some demonstrative embodiments of the invention, clock 182 may selectively assert or de-assert a control signal ("parking signal") 180. For example, clock 182 may assert signal 180 after entering the inactive state of operation, and/or de-assert signal 180 before returning to the active state of operation, as described in detail below.

According to some demonstrative embodiments of the invention, controller 184 may control the operation of logic block 186, for example, by providing logic block 186 with signals 192 including one or more micro-operations to be executed by logic block 186, e.g., as is known in the art. According to some demonstrative embodiments of the invention, logic block 186 may perform one or more logic operations, e.g., corresponding to the micro-operations of signals 192. Although the invention is not limited in this respect, logic block 186 may include, for example, an out-of-order (OOO) module 194, and an execution (EXE) block 198 including one or more execution units (EUs), e.g., EUs 160 and 162. OOO module 194 may include any suitable OOO configuration or architecture, e.g., as is known in the art. The set of execution units may include, for example, one or more adders, multipliers, shifters, and/or any other suitable execution units as are known in the art.

According to some demonstrative embodiments of the invention, execution block 198 may include one or more logic elements. For example, EU 160 may include a logic element 160; and/or EU 162 may include logic elements 166 and 168. Logic elements 164, 166 and/or 168 may include, for example, one or more combination logic elements, e.g., ADD gates, OR gates, NOT gates, and the like; one or more sequential logic elements, e.g., flip-flops (FFs), latches, and the like; and/or any other suitable logic elements, units or components, e.g., as are known in the art. According to some demonstrative embodiments of the invention, controller 184 may cause or instruct a set of one or more EUs of logic block 186 to execute a sequence of one or more micro-operations ("parking sequence") before entering the inactive state of operation, as described in detail below.

According to some demonstrative embodiments of the invention, logic block 186 may include one or more low-leakage (LL) transistors assigned to one or more logic elements, e.g., based on a logic state of logic block 186 in the inactive state of operation, as described below. For example, an LL transistor 170 may be assigned to logic element 164, and/or an LL transistor 172 may be assigned to logic element 168. Additionally or alternatively, one or more logic elements of logic block 186, e.g., logic element 166, may selectively switch to an operation state (e.g., a "parking operation state"), e.g., when signal 180 is asserted. Logic element 166, when in the parking operating state may have a reduced, e.g., minimized, power leakage as described in detail below. For example, while signal 180 is asserted, element 166 may switch one or more data busses and/or data steering selectors to a common state, e.g., a zero state. This may result, for example, in a reduction of the power leakage through selector nodes of element 166.

According to some demonstrative embodiments of the invention, element 166 may include, for example, a wide multiplexer (MUX), and/or a MUX-latch configuration. The power leakage of element 166 may be reduced by setting all data inputs of the MUX to the same logic value, e.g., zero or one, at the parking operation state. This may result in a reduction of the power leakage, e.g., since a source and a drain of pass gates in the MUX may be set to the same voltage. Switching element 166 to the parking operation state may also maintain an output voltage of the MUX at a level close to a power rail. This may result in a reduction in the power leakage on following stages of the MUX.

Figure 2:
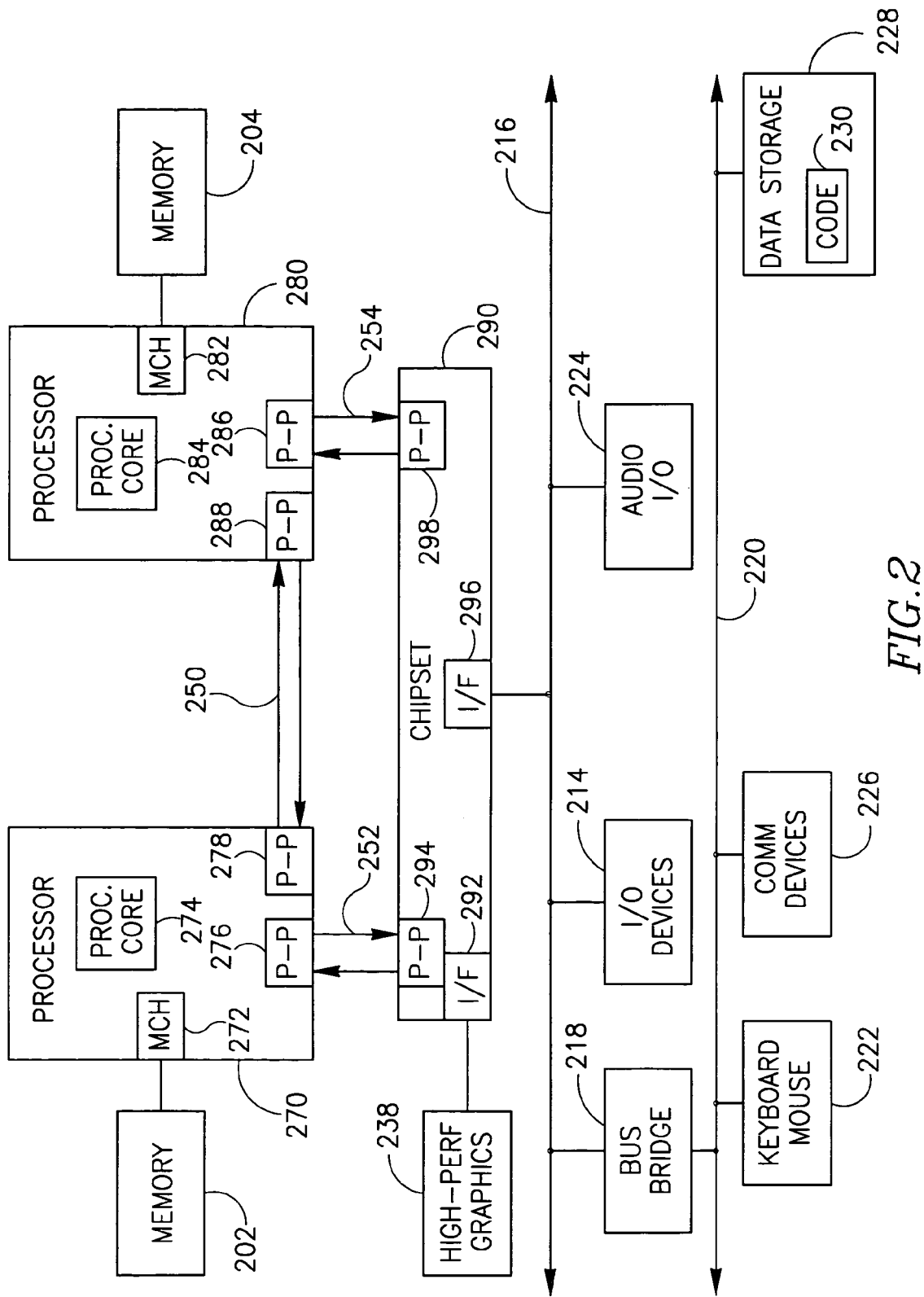
FIG. 2 is a schematic illustration of a computing system including a processor in accordance with another demonstrative embodiment of the present invention.

Reference is made to FIG. 2, which schematically illustrates a computing system 200 in accordance with another demonstrative embodiment of the invention.

According to some demonstrative embodiments of the invention, system 200 may include, for example, a point-to-point busing scheme having one or more processors, e.g., processors 270 and 280; memories, e.g., memories 202 and 204; and/or input/output (I/O) devices, e.g., devices 214, interconnected by one or more point-to-point interfaces. Processors 270 and/or 280 may include processor cores 274 and 284, respectively. Processor cores 274 and/or 284 may include clock 182, controller 184, and/or logic block 186 as are described above with reference to FIG. 1.

According to some demonstrative embodiments of the invention, processors 270 and 280 may also include respective local memory channel hubs (MCH) 272 and 282, e.g. to connect with memories 202 and 204, respectively. Processors 270 and 280 may exchange data via a point-to-point interface 250, e.g., using point-to-point interface circuits 278, 288, respectively. Processors 270 and/or 280 may exchange data with a chipset 290 via point-to-point interfaces 252, 254, e.g., using point to point interface circuits 276, 294, 286, and 298. Chipset 290 may also exchange data with a high-performance graphics circuit 238 via a high-performance graphics interface 292. Chipset 290 may also exchange data with a bus 216 via a bus interface 296. Input/output devices 214 may include, according to some embodiments, low performance graphics controllers, video controllers, and/or networking controllers. e.g., as are known in the art. System 200 may also include, according to some demonstrative embodiments, another bus bridge 218, which may be used, for example, to permit data exchanges between bus 216 and a bus 220. Bus 220 may in some embodiments be a small computer system interface (SCSI) bus, an integrated drive electronics (IDE) bus, or a universal serial bus (USB) bus, e.g., as are known in the art. Additional. I/O devices may be connected to bus 220. For example, system 200 may also include, keyboard and/or a cursor control devices 222, e.g., a mouse; an audio I/O 224; communications devices 226, e.g., including modems and/or network interfaces; and/or data storage devices 228, e.g., to store software code 230. In some embodiments, data storage devices 228 may include a fixed magnetic disk, a floppy disk drive, an optical disk drive, a magneto-optical disk drive, a magnetic tape, or non-volatile memory including flash memory.

Figure 3:
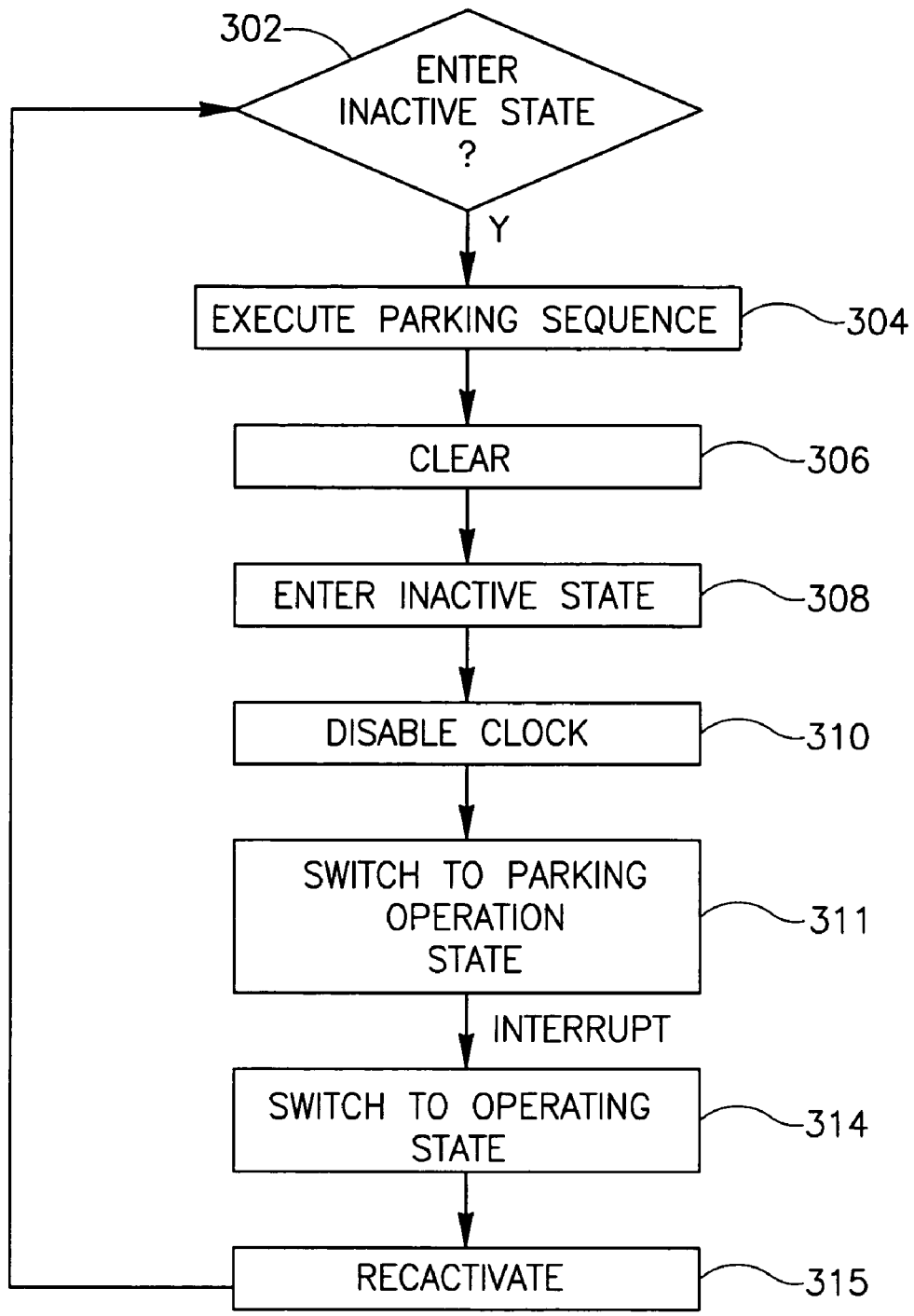
FIG. 3 is a schematic block diagram illustration of a method of entering an inactive state of operation in accordance with some demonstrative embodiments of the invention.

Reference is also made to FIG. 3, which schematically illustrates a method of entering an inactive state of operation in accordance with some demonstrative embodiments of the invention. Although the invention is not limited in this respect, the method of FIG. 3 may be implemented by processor 104 (FIG. 1) and/or processor 200 (FIG. 2).

As indicated at block 302, the method may include determining, e.g., during the active state of operation, whether the inactive state of operation is to be entered. For example, controller 184 may monitor clock signal 188, and based on clock signal 188, determine whether the inactive state of operation is to be entered, e.g., as is known in the art.

As indicated at block 304, the method may also include causing a set of one or more execution units to execute the parking sequence, e.g., subsequent to determining the inactive state of operation is to be entered, and prior to entering the inactive state of operation. Controller 184 may cause or instruct, for example, a set of one or more execution units of block 186 to execute the parking sequence, e.g., subsequent to determining the inactive state of operation is to be entered. For example, after determining the inactive state of operation is to be entered, controller 184 may provide logic block 186 with signals 192 including a sequence of micro-operations representing the parking sequence to be executed by EUs 160 and/or 162.

According to some demonstrative embodiments of the invention, the parking sequence may include micro-operations resulting in one or more of the EUs of block 186, e.g., at least fifty percent of the EUs of block 186, being in a predetermined logic state ("the parking state"). The parking state may be implemented, for example, to reduce, e.g., minimize, a power consumption of logic block 186, e.g., as described in detail below.

As indicated at block 306, according to some demonstrative embodiments of the invention, the method may also include clearing one or more control operations being executed by the set of execution units, e.g., subsequent to executing the parking sequence and prior to entering the inactive state of operation. For example, controller 184 may provide logic block 186 with a clear command signal 191 to cause logic block 186 to clear one or more control operations being performed by logic block 186. Upon receiving clear signal 191, OOO module 194 may clear one or more control operations being executed by EXE block 198, e.g., as is known in the art.

As indicated at block 308, the method may include entering the inactive state of operation. For example, controller 184 may perform a repetitive write operation to a sleep register, e.g., as is known in the art.

As indicated at block 310, the method may also include disabling the clock signal. For example, controller 184 may disable clock 182, e.g., by asserting a control signal 190 as is known in the art.

As indicated at block 311, the method may also include causing one or more logic elements of the set of execution units to switch to the parking operation state, e.g., subsequent to disabling the clock signal. For example, clock 182 may assert parking control signal 180, e.g., upon receiving signal 190 from controller 184. Logic element 166 may maintain the parking operation state while signal 180 is asserted.

The inactive state of operation of processor 104 may be interrupted, e.g., if controller 184 identifies an attempt to execute an operation using logic block 186, as is known in the art. As indicated at block 315 the method may also include returning to the active state of operation. For example, upon identifying the attempt, controller 184 may re-activate clock 182, e.g., by de-asserting signal 190.

As indicated at block 314, the method may also include causing the one or more logic elements which were switched to the parking operation state, to switch back to an operating state, e.g., before returning to the active state of operation. For example, clock 182 may de-assert parking control signal 180, e.g., upon de-assertion of signal 190. Logic element 166 may return, for example, to the operating state, e.g., when signal 180 is de-asserted.

According to some demonstrative embodiments of the invention, the electrical power consumed by processor 104 during the inactive state of operation may be related to a power leakage through one or more of the logic elements of logic block 186. The power leakage through a logic element may depend on a logic state of the logic element.

According to some demonstrative embodiments of the invention, the parking sequence and/or the configuration of logic block 186 may be determined such that a power leakage of block 186 during the inactive state of operation may be reduced, e.g., minimized, as described below. According to some demonstrative embodiments of the invention, the parking sequence may be determined such that the power leakage of one or more of the logic elements of logic block 186 may be reduced, e.g., minimized, during the inactive state of operation, as described below.

According to some demonstrative embodiments of the invention, the power leakage of the logic elements of block 186 during the inactive state of operation may be determined based on the parking state of block 186. One or more LL transistors may be assigned to one or more logic elements of block 186, e.g., based on the parking state of logic block 186. The LL transistors may be assigned to the logic elements, for example, according to the determined power leakage at the parking state. For example, an LL transistor 170 may be assigned to logic element 164, and/or an LL transistor 172 may be assigned to logic element 168, e.g., if logic elements 164 and/or 168 are determined to have, when at the parking state, a power leakage higher than a predetermined level.

Figure 4:
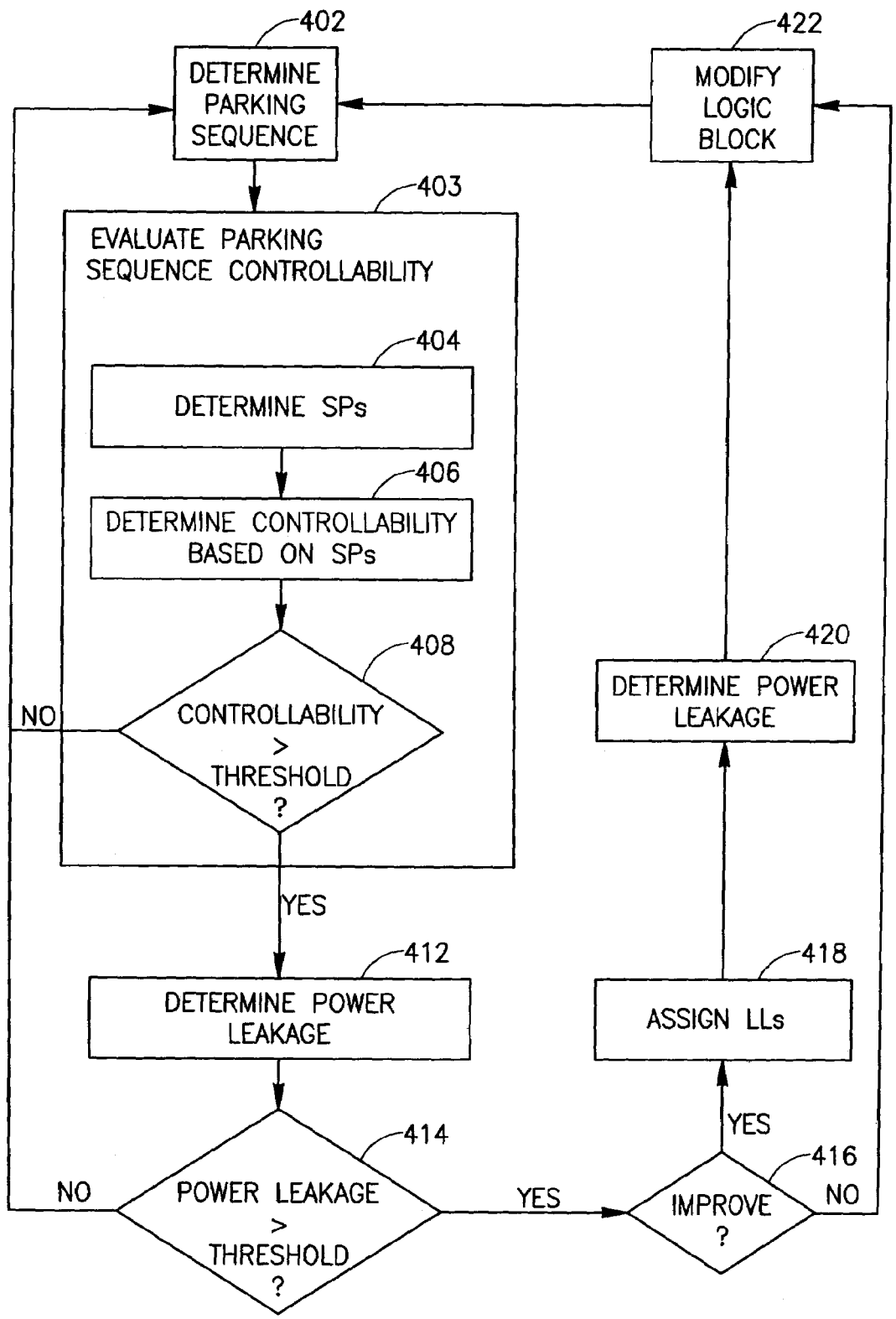
FIG. 4 is a schematic block diagram illustration of a method of configuring a processor in accordance with some demonstrative embodiments of the invention.

Reference is now made to FIG. 4, which schematically illustrates a method of configuring a processor according to some demonstrative embodiments of the invention. Although the invention is not limited on this respect, the method of FIG. 4 may be implemented to configure processor 104 (FIG. 1) and/or processor 200 (FIG. 2). For example, the method of FIG. 4 may be implemented to determine the parking sequence to be applied to logic block 186 (FIG. 1); and/or to configure logic block 186 (FIG. 1), e.g., by assigning one or more LL transistors, e.g., LL transistors 170 (FIG. 1) and/or 172 (FIG. 1), and/or configuring an operation parking state of one or more logic elements, e.g., logic element 166 (FIG. 1).

As indicated at block 402, the method may include determining a parking sequence to be applied to a plurality of logic elements of the logic block. For example, an initial parking sequence may be determined based on a given configuration of the logic block. The initial parking sequence may be based, for example, on the number, location, arrangement and/or type of the logic elements.

According to some demonstrative embodiments of the invention, the parking sequence may be intended to last a predetermined number of operation phases, denoted N. The number of phases N may correspond for example, to the number of cycles, denoted Cl, required for executing the parking sequence, e.g., N=2Cl. The logic block may include a plurality of combination logic elements, and a plurality of sequential logic elements, e.g., as described above with reference to FIG. 1. It will be appreciated by those of ordinary skill in the art that the logic state of the combination logic elements may be determined based on the logic state of the sequential elements. Thus, according to the demonstrative embodiments of the invention described below, the parking sequence may be evaluated based on a controllability analysis relating to the sequential logic elements, e.g., without relating to the combination logic elements. It will be appreciated by those of ordinary skill in the art, that according to other embodiments of the invention, any other suitable method or analysis may be used for determining and/or evaluating the parking sequence.

As indicated at block 403, according to some demonstrative embodiments of the invention, the method may include evaluating a controllability level of the parking sequence, e.g., based on a controllability of the sequential logic elements when applying the parking sequence. A sequential logic element may be defined, for example, as controllable, if applying the parking sequence to an arbitrary, e.g., unknown, state of the sequential element may result in the sequential element maintaining a known logic value ("signal probability (SP) value"), e.g., zero or one, for a predefined interval of n phases, e.g., n=30, at the end of the parking sequence. The controllability of the parking sequence may be determined, for example, by the percentage of controllable sequential elements.

According to some demonstrative embodiments of the invention, the controllability of the parking sequence may be measured using a three-valued simulation, e.g., having the possible values of zero, one, and an unknown value, denoted X, as is known in the art. For example, the parking sequence may be applied to a logic state where all the sequential elements initially have the unknown value X. The sequential elements that maintain a constant value, e.g., zero or one, during the last n phases of the simulation may be determined as controllable.

As indicated at block 404, evaluating the controllability level of the parking sequence may include, for example, determining a plurality of SP values corresponding to the plurality of logic elements during one or more of the N phases. For example, a SP value may be determined for a sequential element at an i-th phase according to a simulated logic state, e.g., zero one or X, of the sequential element at the i-th phase.

As indicated at block 406, evaluating the controllability level of the parking sequence may also include determining the controllability level of the parking sequence based on the plurality of SP values. For example, the controllability of the parking sequence may be determined based on the percentage of the sequential elements having a known value, e.g., zero or one, for the n phases.

As indicated at block 408, the method may also include determining whether the controllability level of the parking sequence is equal to or higher than a predetermined controllability threshold, e.g., a controllability level corresponding to 90% of the sequential elements having a known value. The method may also include re-defining the parking sequence, e.g., as indicated at block 402, for example, if the controllability level of the parking sequence is lower than the controllability threshold.

Although the invention is not limited in this respect, a symbolic simulation method, e.g., a symbolic trajectory evaluation (STE) method as is known in the art, may be implemented for performing one or more of the operations described above with reference to blocks 403, 404, and/or 406.

Figure 5:
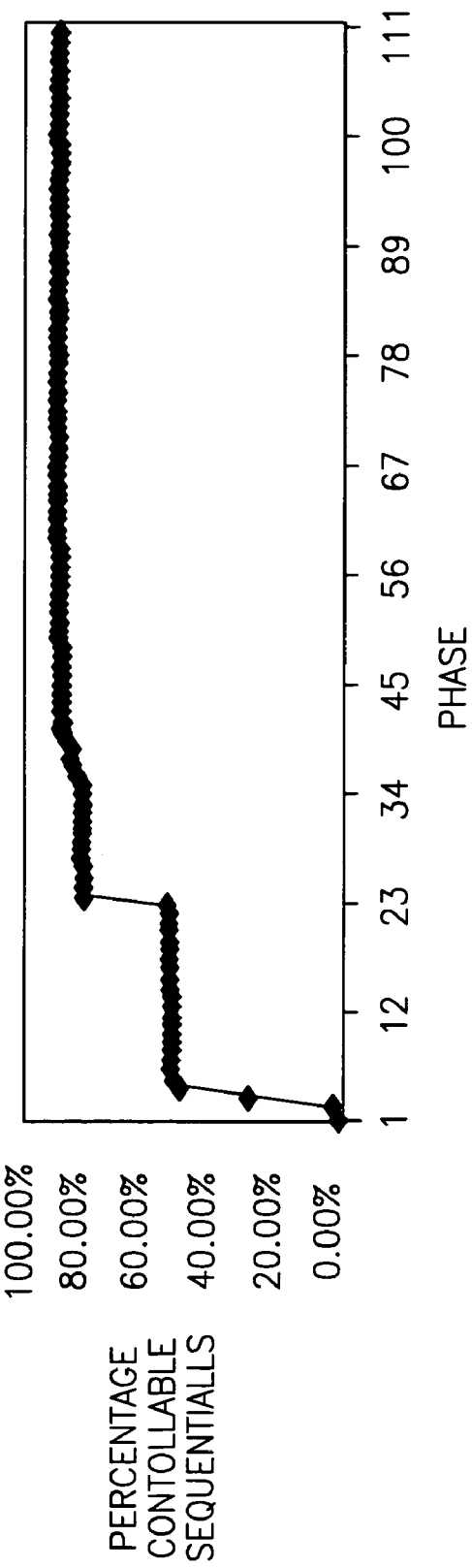
FIG. 5 is a schematic graph depicting a percentage of controllable sequential logic elements versus phases of a parking sequence in accordance with some demonstrative embodiments of the invention.

FIG. 5 is a schematic graph depicting a percentage of controllable sequential elements versus the phase of the parking sequence. As shown in FIG. 5, the controllability may reach approximately 80%, after approximately 30 phases of the parking sequence. The controllability may increase to about 90%, e.g., after approximately 60 phases of the parking sequence.

Referring back to FIG. 4, as indicated at block 412, the method may also include determining and/or analyzing a power leakage of the logic block, e.g., including one or more combination logic elements and/or sequential elements, when at the parking state. Any suitable power leakage analysis and/or power estimation method, e.g., as are known in the art, may be implemented to determine and/or analyze a power leakage.

As indicated at block 414, the method may also include determining whether the power leakage of the logic block is equal to or lower than a predetermined leakage threshold. The method may include re-defining the parking sequence, e.g., if the power leakage of the logic block is higher than the leakage threshold.

As indicated at block 416, the method may also include determining whether a power leakage and/or a timing efficiency of the logic block, e.g., lock 186, may be improved, e.g., by assigning one or more low-leakage (LL) transistors, e.g., as described below.

As indicated at block, 418, the method may also include assigning one or more LL transistors to one or more logic elements of the logic block based on the parking state of the logic block, e.g., as described below.

According to some demonstrative embodiments of the invention, the knowledge of the parking state of the logic block may be exploited to assign one or more LL transistors to logic elements, e.g., based on a power leakage of the elements when in the parking state. In addition, an effective leakage of a stack of logic elements, e.g., transistors, may be evaluated based on the parking state of every element in the stack. This may enable weighing the logic elements in the stack according to their power leakage when at the parking state, e.g., rather than according to transistor size and/or a state probability. For example, a stack of two or more transistors including more than two transistors in the parking state may have a X10 leakage reduction, resulting in an effective Z that is 10X smaller, e.g., compared to a stack having less that two transistors at the parking state. If only one transistor in the stack is at the parking state, and the transistor is not the closest transistor to the output of the stack, then the leakage may be reduced by approximately 40%, resulting in an effective Z which is approximately X0.6 smaller. Thus, it will be appreciated by those of ordinary skill in the art, that the knowledge of the parking, state may enable assigning LL transistors based on the transistor power leakage at the inactive state of operation. Accordingly, the assignment of the LL transistors based on the parking state may result in a relatively large reduction in the power leakage. According, to some demonstrative embodiments of the invention, the logic block may include one or more timing critical paths, e.g., as is known in the art.

According to some demonstrative embodiments of the invention, LL transistors may be assigned to a logic elements based on the power leakage of the logic element at the parking state, and/or based on whether the logic element is part of the timing critical path. For example, the LL transistors may be assigned to the logic elements of the logic block based on the following rules:

For logic elements of a critical timing path, as long as timing boundaries allow, assign LL transistors on logic elements having the highest power leakage at the parking state.

If a speed degradation is allowed, assign additional LL transistors to a path having a timing margin below a timing, insertion limit. The additional LL transistors may be assigned to the logic elements on the path, for example, based on a combination of speed degradation and a power leakage reduction resulting from the assignment of the LL transistors.

For both the above cases, the insertion of the LL transistors may be prioritized according to an effective leakage of logic elements, e.g., when taking into consideration the effective stacking of the logic elements, as may be implied from the logical state of all the logic elements in the stack.

Although the invention is not limited in this respect, any suitable power compiling as is known in the art, may be implemented for performing one or more of the operations described above with reference to blocks 416, and/or 418.

As indicated at block 420, the method may also include determining and/or analyzing a power leakage of the logic block, e.g., after assigning the LL transistors.

As indicated at block 422, the method may also include modifying the logic block, e.g., n accordance with the assigned LL transistors.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
  a controller to determine whether a processor is to enter an inactive state of operation, and to cause a set of one or more execution units to execute a sequence of one or more micro-operations subsequent to the determination and prior to entering said inactive state, wherein the sequence is to cause one or more logic elements of the set of execution units to be placed in a first operating state to reduce power leakage in the one or more logic elements, the one or more logic elements having at least one low leakage transistor assigned thereto based at least in part on a comparison of a power leakage of the corresponding logic element when an initial parking sequence is applied to the logic element to a threshold and evaluation of a controllability level of the initial parking sequence.

2. The apparatus of claim 1, wherein said set of execution units comprises a plurality of logic elements, said sequence comprises a sequence of micro-operations resulting in a parking operating state of one or more of said plurality of logic elements.

3. The apparatus of claim 2, wherein said sequence comprises a sequence of micro-operations resulting in the parking operating state of at least half of said logic elements.

4. The apparatus of claim 3 wherein the plurality of low leakage transistors are assigned to one or more of said logic elements based on a power leakage level of said logic elements at said parking operating state.

5. The apparatus of claim 2, wherein subsequent to causing said set of execution units to execute said sequence, said controller is able to generate a clear signal to clear one or more control operations being executed by said set of execution units.

6. The apparatus of claim 1 comprising a clock to provide a clock signal to said set of execution units, and subsequent to entering said inactive state, to assert a control signal to cause the one or more logic elements of said set of execution units to maintain the first operating state.

7. The apparatus of claim 6, wherein when in said first operating state, inputs of said one or more logic elements have a predetermined value.

8. The apparatus of claim 6, wherein said clock is able to de-assert said control signal prior to exiting said inactive state.

9. The apparatus of claim 1, wherein the sequence is to cause inputs to a selector element of a first logic element to a common state and wherein an output of the selector element is at a level close to a power rail.

10. The apparatus of claim 1, wherein the one or more logic elements is modified in accordance with the assigned at least one low leakage transistor.

11. A system comprising:
a processor including a controller to determine whether said processor is to enter an inactive state of operation, and to cause a set of one or more execution units to execute a sequence of one or more micro-operations subsequent to the determination and prior to entering said inactive state, wherein one or more logic elements of the set of execution units have at least one low leakage transistor assigned thereto based at least in part on a comparison of a power leakage of the corresponding logic element when an initial parking sequence is applied to the logic element to a threshold and evaluation of a controllability level of the initial parking sequence; and
a memory to store data to be processed by said processor.

12. The system of claim 11, wherein said sequence comprises a sequence of micro-operations resulting in a parking operating state of the one or more logic elements.

13. The system of claim 12, wherein said sequence comprises a sequence of micro-operations resulting in the parking operating state of at least half of said logic elements.

14. The system of claim 12, wherein the plurality of low leakage transistors are assigned to one or more of said logic elements based on a power leakage level of said logic elements at said parking operating state.

15. The apparatus of claim 12, wherein subsequent to causing said set of execution units to execute said sequence, said controller is able to generate a clear signal to clear one or more control operations being executed by said set of execution units.

16. The system of claim 11, comprising a clock to provide a clock signal to said set of execution units, and subsequent to entering said inactive state, to assert a control signal causing one or more logic elements of said set of execution units to maintain a first operating state.

17. The system of claim 16, wherein when in said first operating state, inputs of said one or more logic elements have a predetermined value.

18. The apparatus of claim 16, wherein said clock is able to de-assert said control signal prior to exiting said inactive state.

19. The system of claim 11, wherein the one or more logic elements is modified in accordance with the assigned at least one low leakage transistor.

20. A method comprising:
determining an initial parking sequence to be applied to at least one logic element of an execution unit;
evaluating a controllability level of the initial parking sequence;
determining a power leakage of the at least one logic element when at a parking state corresponding to the initial parking sequence;
assigning at least one low leakage transistor to the at least one logic element based at least in part on the power leakage at the parking state;
determining the power leakage of the at least one logic element after assignment of the at least one low leakage transistor; and
modifying the at least one logic element in accordance with the assigned at least one low leakage transistor.

21. The method of claim 20, further comprising assigning the at least one low leakage transistor based at least in part on a timing efficiency of the at least one logic element.

22. The method of claim 20, wherein evaluating the controllability level includes:
determining signal probability values corresponding to a plurality of logic elements of the execution unit; and
determining the controllability level based on the signal probability values.

23. The method of claim 22, further comprising determining if the controllability level exceeds a threshold and if so, determining the power leakage, otherwise re-defining the initial parking sequence to a second parking sequence.

24. The method of claim 20, further comprising assigning the at least one low leakage transistor to a first logic element having a highest power leakage at the parking state if the first logic element is in a critical timing path.

25. The method of claim 24, further comprising assigning at least one other low leakage transistor to a path having a timing margin below a timing insertion limit if a speed degradation is allowed.

* * * * *